United States Patent [19]

Heklowski et al.

[11] 4,059,958

[45] Nov. 29, 1977

[54] AUTOMOTIVE ENGINE EXHAUST — CLEAN AIR SYSTEM

[75] Inventors: Florian Heklowski; William Nicholas, both of Chicago, Ill.

[73] Assignee: Florian Heklowski, Chicago, Ill.

[21] Appl. No.: 669,095

[22] Filed: Mar. 22, 1976

Related U.S. Application Data

[63] Continuation-in-part of Ser. No. 442,928, Feb. 15, 1974, abandoned.

[51] Int. Cl.$^2$ .......................... F02G 3/00; F01N 5/04
[52] U.S. Cl. ........................................ 60/614; 60/280; 60/619
[58] Field of Search .............. 60/606, 614, 617, 39.19, 60/597, 613, 619, 280, 39.52, 39.16; 415/77, 78

[56] References Cited

U.S. PATENT DOCUMENTS

| | | | |
|---|---|---|---|
| 2,526,281 | 10/1950 | Ryan et al. ............................. | 415/77 |
| 2,583,651 | 1/1952 | Horning ................................. | 60/606 |
| 2,633,698 | 4/1953 | Nettel ..................................... | 60/606 |
| 3,163,984 | 1/1965 | Dumont .................................. | 60/606 |

FOREIGN PATENT DOCUMENTS 1,194,802  11/1959  France .................................. 415/77

Primary Examiner—William L. Freeh
Assistant Examiner—Louis J. Casareyola
Attorney, Agent, or Firm—Richard J. Myers; John J. Kowalik

[57] ABSTRACT

An internal combustion engine of the spark or diesel ignition type and having an anti-pollution arrangement for the reduction of the products of incomplete combustion and crankcase evaporation and said arrangement including a turbine adapted to receive exhaust gases and being connected to the engine through an overriding clutch to drive the turbine yet allowing for overriding faster rotation of the turbine through secondary ignition of the exhaust or other unburned gases. The turbine includes a fuel supply to aid in ignition of exhaust gases and may include a fuel supply with an aromatic indicator fluid which loses its aroma upon oxidation at a predetermined temperature thereby indicating if the turbine temperature is high enough to completely eliminate unburned exhaust and other gases without recycling said gases through the engine.

10 Claims, 13 Drawing Figures

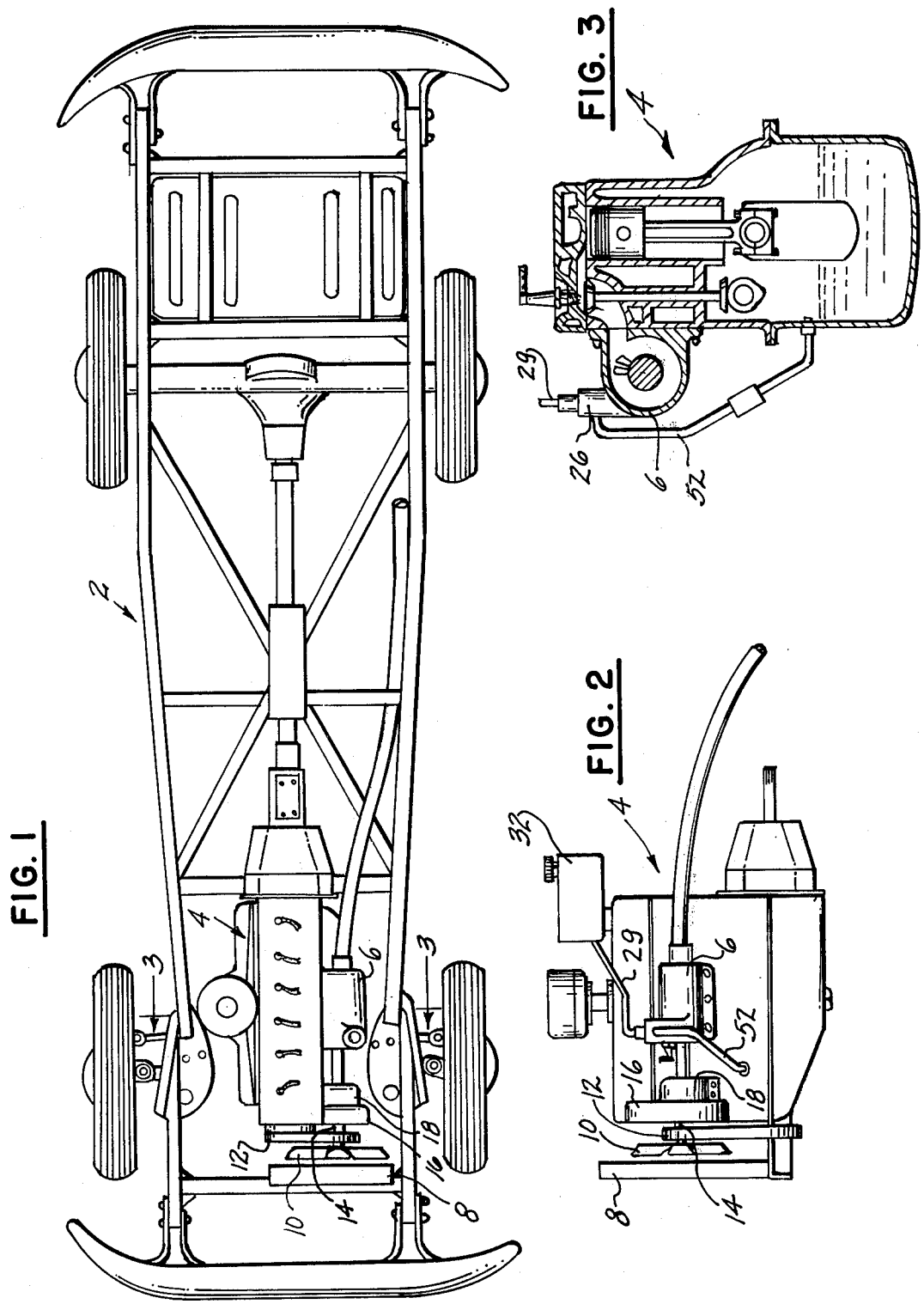

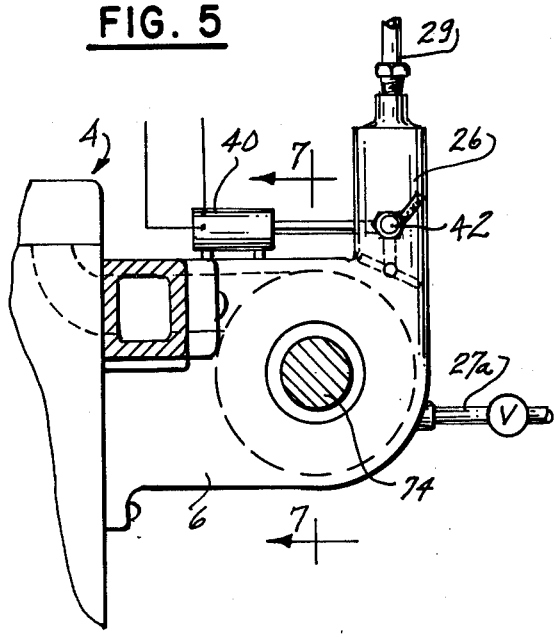
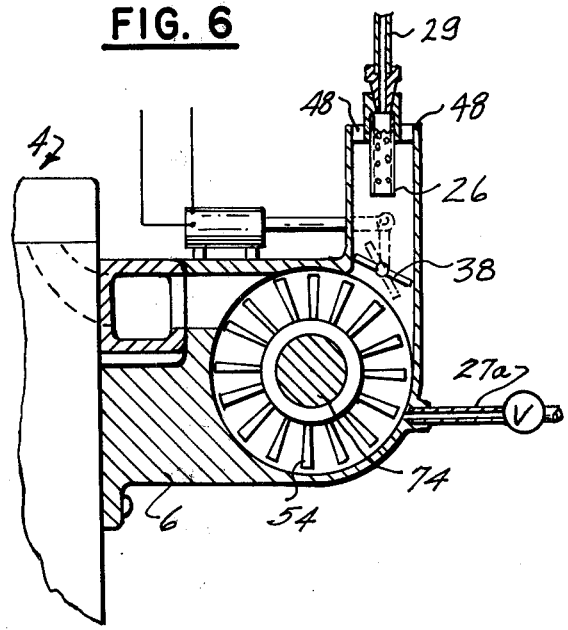
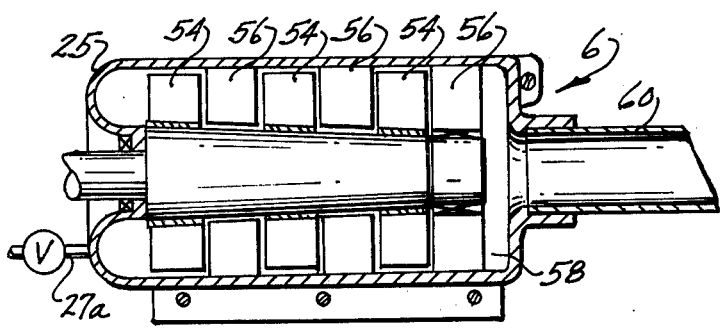
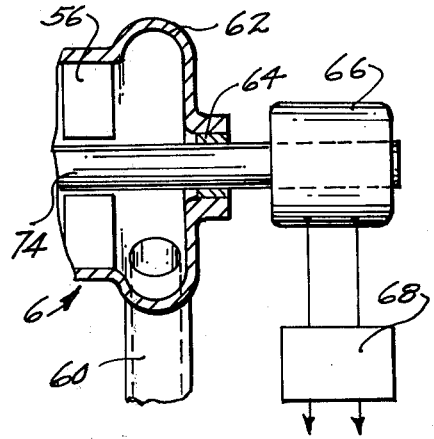
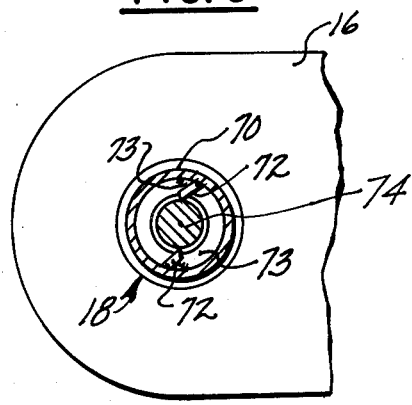
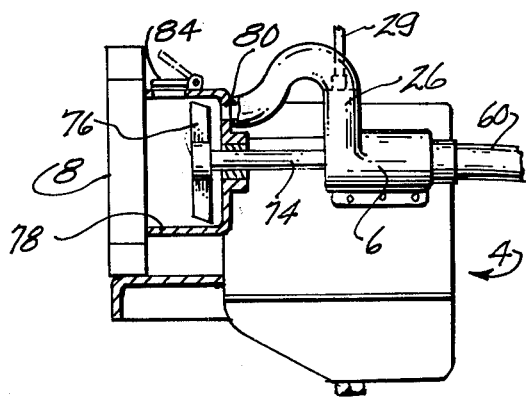

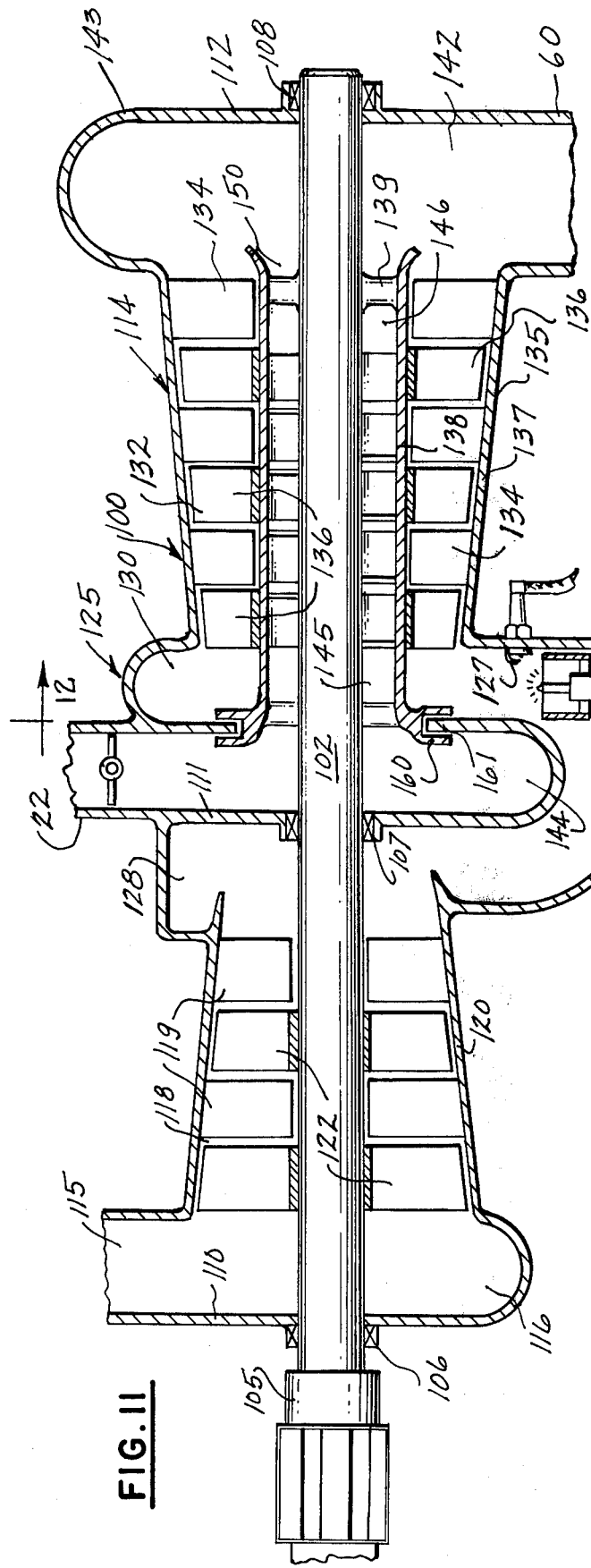
FIG.11
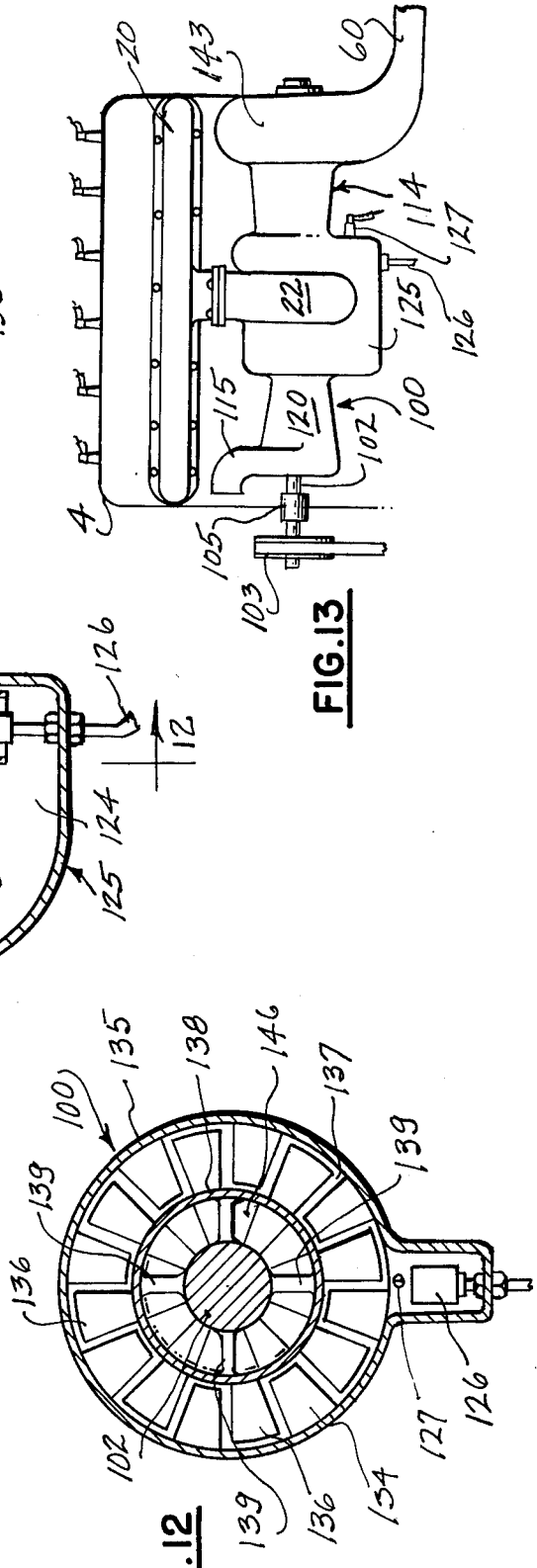
FIG.13
FIG.12

AUTOMOTIVE ENGINE EXHAUST — CLEAN AIR SYSTEM

BACKGROUND OF THE INVENTION

This application is a continuation-in-part of Application Ser. No. 442,928 filed Feb. 15, 1974, now abandoned.

FIELD OF THE INVENTION

This invention is directed to an anti-pollution device for an automobile or truck engine and provides a turbine driven by ignited exhaust gases. This application is a continuation in part of our application Ser. No. 442,928 filed Feb. 15, 1974, now abandoned.

DESCRIPTION OF THE PRIOR ART

Previously used afterburners or scavengers driven by exhaust gases did not reduce pollution by burning the exhaust gases but merely raised the efficiency of the engine by utilizing the high velocity and heat of the exhaust gases for pre-heating and for compressing air introduced into the combustion chamber and occasionally driving auxiliary equipment such as fuel pumps. Any re-burning of exhaust gases or engine fumes occurred in the engine combustion chamber. This recycling would reduce unburned hydrocarbons but drastically reduce engine performance and mileage as witnessed by recent automobile gas mileage statistics. The present invention eliminates air pollution by reburning exhaust gases and engine fumes by oxidation outside the engine while retaining good performance and mileage.

SUMMARY OF THE INVENTION

This invention addresses itself primarily to an apparatus for the elimination of toxic and polluting gases in the exhaust of automotive engines. An exhaust turbine is used for the elimination and reduction of toxic and polluting gases in the exhaust gases of the engines. With this in mind therefore the following are the objects of this invention:

It is an object of this invention to utilize the burning of exhaust gases of automotive engines to drive a turbine and utilize the energy developed therefrom.

It is another object of this invention to utilize the cooling fan shaft of an automobile engine as a rotation helper for the shaft of an exhaust gas turbine.

It is still another object of this invention to shape and position the entrance opening of the exhaust gas turbine so that exhaust gas emissions from the engine assists the rotation of the exhaust gas turbine more efficiently.

It is still another object of this invention to provide an exhaust gas turbine for an automotive engine and provide an additional charging fluid nozzle to keep the exhaust turbine rotating at high, relatively constant speed, temperature, and efficiency to further reduce and eliminate toxic and polluting gases in the exhaust gases at low and high speeds.

It is still another object of this invention to provide a fluid charging nozzle in an exhaust gas turbine in an engine in which an aromatic or indicator fluid is used in combustion with the exhaust gas emissions wherein the aromatic or indicator fluid is oxidized at a higher temperature than the oxidation of the toxic or polluting gases or in a normal engine exhaust, thereby providing an instant method of checking the efficiency of the exhaust reduction system by indication of a residue of the aromatic or indicative fluid in the final exhaust gases.

It is still another object of this invention to bleed the crankcase gases of an engine through an exhaust gas turbine to reduce the toxic and polluting gases and increase the efficiency of the present day engines which bleed into the inlet side of the engine cylinders.

It is still another object of this invention to provide an exhaust gas turbine in an engine which will reduce toxic and polluting gases and in combination will reduce the noise of the exhaust of the engine by baffling and natural muffling which occurs in each stage in the exhaust turbine.

It is still another object of this invention to provide an exhaust gas turbine in an engine utilizing a radiator fan as the cooling fan for the radiator cooling system as well as to providing additional compressed air to increase the air-fuel ratio of the gases being burned in the exhaust gas turbine.

BRIEF DESCRIPTION OF THE DRAWINGS

With all of the above objects in mind, therefore, particular reference is made to the drawings in which:

FIG. 1 is a plan view of an automobile engine and chassis assembly showing the general location and layout of the components of the invention;

FIG. 2 is a side elevation view of the engine showing the general location of the parts of this invention;

FIG. 3 is an enlarged section of FIG. 1 along the lines 3—3 showing the relation of an engine exhaust system and exhaust gas turbine as used in this invention;

FIG. 5 is a sectional view taken substantially along the lines 5—5 of FIG. 4 showing the elevation end view of the exhaust gas turbine and parts;

FIG. 6 is a sectional view taken substantially along the lines 6—6 of FIG. 4 showing a sectional view of the entrance end of the exhaust gas turbine;

FIG. 7 is a sectional view taken substantially along the lines 7—7 of FIG. 5 showing the general arrangement of the driveshaft, exhaust pipe and staging in the exhaust gas turbine;

FIG. 8 is a portion of the exhaust end of a modified gas turbine like FIG. 7 showing an alternator coupled thereto;

FIG. 9 is a sectional view taken along the lines 9—9 of FIG. 4 showing the fan shaft override connection to the exhaust gas turbine; and, FIG. 10 is another embodiment of the exhaust gas turbine and is in partial cross section showing an engine in which a shroud or housing section is substituted for the conventional radiator cooling fan to supply air to the exhaust gas turbine as well as cool the radiator.

Description of Views 11-13

Figure 4:
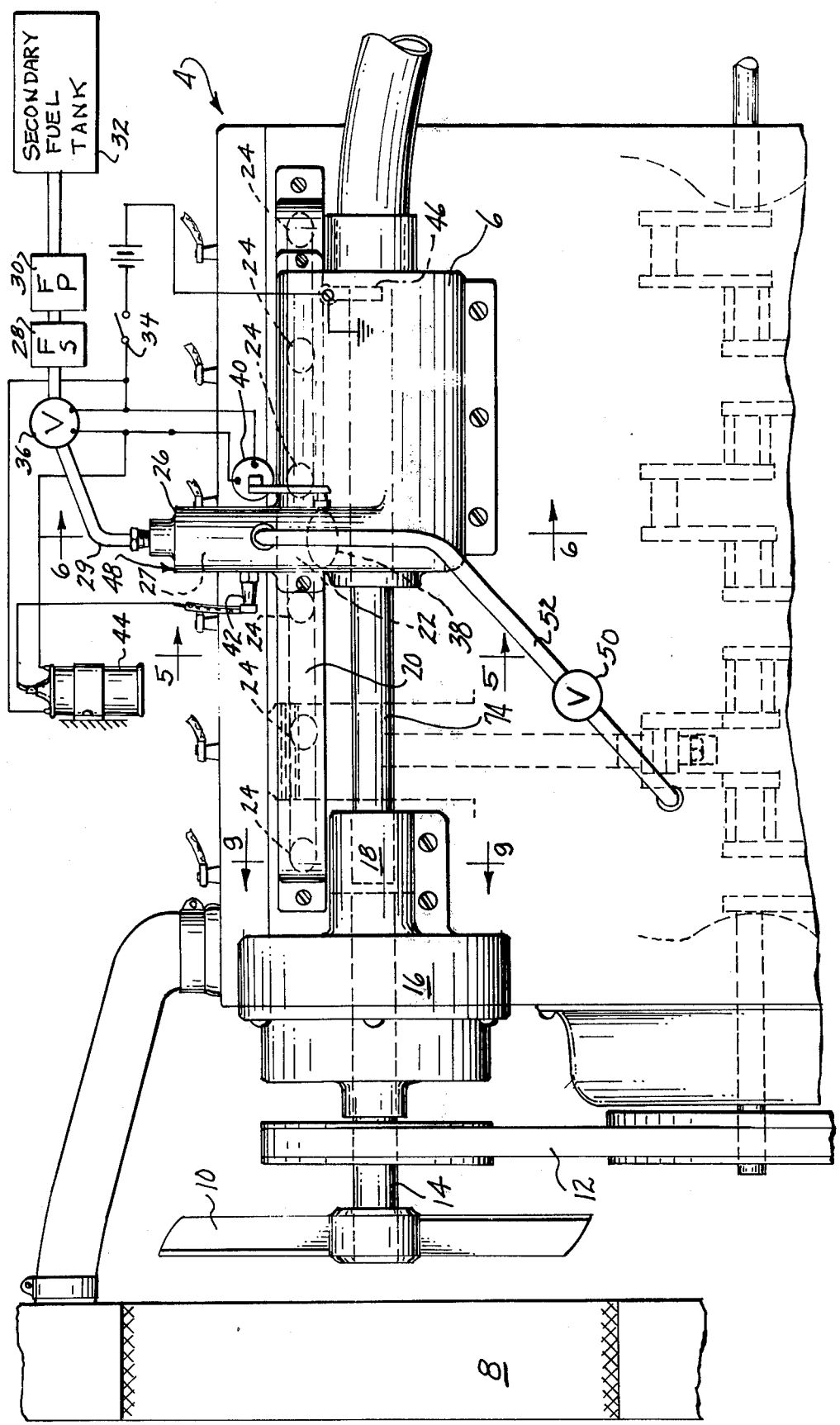
FIG. 4 is an enlarged partial side view of an engine partly diagrammatic, showing much detail and the inter-relation of the parts of this invention.

FIG. 11 is an enlarged cross-sectional view of another form of auxiliary burner and turbine assembly;

FIG. 12 is a cross-section taken substantially on line 12—12 of FIG. 11; and

FIG. 13 is a reduced side elevational view of the assembly shown in FIG. 11 associated with the internal combustion engine.

DESCRIPTION OF THE PREFERRED EMBODIMENTS

To more fully understand and comprehend this invention, reference is made to the drawings, in which:

FIGS. 1 and 2 show an engine chassis 2 with an engine 4 which as shown is a 6-cylinder in line engine. The invention is not restricted to this type of engine but this engine has been selected as one of many ways of disclosing the invention. The invention can be mounted on any conventional spark or compressor (i.e. diesel) ignition engine. The exhaust gas turbine 6 is mounted on the exhaust side of engine A as shown and may be in line with an associated radiator 8 and radiator fan 10 and connected to the engine workshaft by engine drive pulley 12. As can be seen, the line of radiator 8 and radiator fan 10 can be shifted to be more in line with the exhaust gas turbine 6. Radiator fan 10 is connected to the fan shaft 14 which extends through water pump 16 and override clutch 18 into the driving end of gas turbine 6. Referring now to FIG. 3 it is seen how the typical exhaust design allows the exhaust of the engine to enter the combustor or mixing chamber where mixing occurs between a secondary fuel and the exhaust gases. Excess air fed into annular housing 25 through conduit 27a may be added to the products of this secondary combustion to reduce the temperature of gases introduced into the blade section of the turbine. The addition of excess air after combustion lowers the temperature of turbine drive gases thereby eliminating the need for expensive alloy turbine blades and increasing the appeal for this type of exhaust gas treating apparatus.

At start-up of the engine, the engine turns the radiator cooling fan 10 which in turn rotates the rotor of the exhaust gas turbine 6 until the rotational speed of the turbine exceeds the speed of the fan shaft, at which time the turbine becomes self powered depending upon the air-fuel ratio and flow rate of the burned exhaust gases and excess air through the turbine 6.

Referring now to FIG. 4 the entire system is shown in greater detail. The exhaust gas turbine 6 is mounted on the exhaust manifold 20 at the main manifold outlet 22; individual cylinder outlets are at 24. The exhaust gases of the engine issuing through each individual cylinder outlet 24 and then leading through main outlet 22 into the mixing chamber or combustor section 27 of the turbine 6. Mixing of exhaust gases and a secondary fuel, injected through nozzle 26, occurs in the chamber 27. As shown in FIG. 7 the gas moves initially into the annular entrance 25 then through successive stages and exhausts to the atmosphere. While the exhaust gas turbine is not limited to three stages, it could be as low as 1 stage or more, it is felt that 3 stages would best utilize all the energy of the exhaust gases and thereby increase engine performance and efficiency.

The secondary fuel nozzle 26 as shown in FIGS. 4, 5 and 6 is fed fuel from secondary fuel supply 28 FIG. 4 through secondary fuel tube 29 which receives fuel from secondary fuel pump 30 which keeps fuel in and under pressure in secondary fuel supply 28, (secondary fuel pump 30 receives fuel from secondary fuel tank 32).

Upon closing ignition switch (turning engine key) 34 when engine starts, secondary fuel valve 36 is opened to admit secondary fuel into secondary fuel nozzle 26. Simultaneously with the above sequence, secondary flutter valve 38 is opened by action of secondary flutter valve solenoid 40 and secondary spark plug 42 is energized with sparking circuit when secondary spark coil 44 is also energized. The turbine temperature sensor 46 is mounted on the output of the exhaust gas turbine 6. This temperature sensor should be in series for example ground to ignition switch 34 to thereby act as a complete safety valve to immobilize the auxillary fuel system when overheating occurs. When the temperature at this point exceeds the temperature which could cause damage to the blades of the turbine the curcuit is opened, cutting off the secondary fuel and electrical spark system and closing secondary flutter valve 36. The turbine 6 will then be operating only on engine output. When the temperature of the output is reduced sufficiently the turbine temperature sensor 46 then closes the circuit, putting the secondary fuel system back into operation. The secondary fuel is used to increase oxidation of toxic and polluting gases in the exhaust, to maintain an even flow of hot gas through the turbine. When the proper secondary fuel is used so that by smell or other indicative tests such as exhaust color in output, exhaust gas is negligible, the temperature in the exhaust turbine would have been high enough to oxidize all toxic and polluting parts of the engine exhaust. It is presumed that the secondary fuel will be used sparingly by just keeping the turbine operating efficiently and suitable to keep the operational cost of the turbine system economical.

Some of the secondary fuels suggested are:

the alcohol family; Methane, Ethane, Propane, Butane, etc.; Olefins family; Ethene, Butene, Isobutene, etc.; the Diolefin family, Heptodiene, etc.; the Naphthalene or Cycloparaffin family; cyclohexane, cyclopentane, etc.; and the aromatic family, Benzine, Paraxylene, Naphthalene series. Other aromatic fuels may be used as indicators when mixed with one or more of the above.

While secondary fuels named are all petroleum derivatives in the normal fuel types, they need not be restricted to that. For instance, a particular smelling oil or liquid may be mixed with another fuel so that when exhaust burning temperature are reached, the perfume or odor disappears thereby indicating elimination of these undesirable gases (when samples of exhaust gases are tested by smell).

Also, the internal combustion cycle only burns a part of each cylinder charge completely — a gas turbine can burn almost all fuel in air-fuel mixture, particularly if the turbine has light or no load on it. Temperatures reached in a turbine combustion chamber are much higher than exhaust gas temperatures of internal combustion engines. When the ignition key is inserted in the automobile and the switch of the engine is closed, the switch for the exhaust turbine system is also closed. A time delay circuit may be included in the secondary fuel system to delay injection of secondary fuel into the chamber 27 until the turbine blades have been preheated by exhaust gases and thereby have reached operating temperatures. Secondary fuel pump 30 can be an additional fuel section of a tandem fuel pump of the automobile or can be an individual pump used only in the secondary fuel system. Air for the secondary fuel system is supplied through secondary air ports 48 in FIG. 6. Crankcase vapors expand through check valve 50 and within the combustion chamber 27. An advantage here is that at present on newer automobiles these engine vapors and exhaust gases are now bled back into the engine through a PVC valve and then through the engine intake, reducing the efficiency of the engine by reducing the air-fuel ratio and tending to contaminate the inside of the cylinder of the engines as these vapors contain portions of unburned or partly burned gasolene, and partially decomposed oil and carbon.

FIG. 7 shows a section view of the staging of the turbine. As explained before, three stages are shown (1 impeller 54 and one stator 56 for each stage) but any other suitable number of stages can be used. Also the design of the blades and the inside of the turbine of the turbine engine are such as to induce a limited amount of surface turbulence which will promote oxidation and reduce the noise of expansion of pockets of exhaust gas from the engine by buffering or bottling the burner gases through the turbine.

In FIG. 7 the outlet 58 of the turbine is connected to exhaust pipe 60 and thence to outside. FIG. 8 shows a modified output end of the exhaust turbine in which a bellmouth output housing 62 allows the output exhaust to collect in a circular manner and allows an outlet shaft bearing 64 to be mounted in the end plate. Exhaust pipe 60 is connected to the periphery of the bell mouth outlet 62. Shaft 14 as extended through the turbine is connected to alternator 66 of which in turn the electrical output is connected to the transformer 68 in which the alternating current voltage is stepped up or down — up for high voltage ignition of incoming air for the secondary nozzle 26 or lower voltage for electrical accessories.

FIG. 9 is a cross-sectional of FIG. 4 along the lines 9—9 and shows how fan shaft 14 is connected to clutch housing 70 upon which clutch figures 72 are urged by clutch springs 75 against turbine shaft 74. The clutch used may be of the Sprague type which is commercially available for power transmission applications. Thus when the turbine shaft 74 rotates slower than clutch housing 70 the fan shaft 14 drives the turbine shaft 74. When turbine shaft 74 rotates faster than clutch housing 70 the shaft will slip as the locking action of clutch fingers 72 will not be effective. Therefore, as long as the engine is actually turning over, the impeller of the gas exhaust turbine will be turning over and will not require extra fuel necessary to start the turbine from a static position.

FIG. 10 is another modification of the invention in which a compressor fan 76 is directly connected to the exhaust turbine shaft 74 and is independent of the engine drive system. Compressor shroud or housing 78 is sealed about the radiator 8 and is journaled in the compressor housing 78. The output of compressor fan goes through compressor outlet 80 through outlet tube 82 into secondary air ports 48 to provide air for combustion of the exhaust gases and the secondary fuel. The outlet tube 82 may include a branch for introducing excess air into the annular housing 25 to cool the burned gases and prevent overheating of the turbine blades. Input of the compressor fan 76 is through the radiator 8. Air mixing vent 84 includes suitable open control equipment 40 and close in response to the turbine temperature sensor 46 to control the flow of excess air into the gas turbine. Thus in this system, water of the engine has heat removed by air which then flows through conduit 82 to provide preheated air used in burning exhaust gases and the secondary fuel thereby increasing efficiency of both the engine and exhaust gas turbine. It can be seen therefore with this system that great strides can be made in the reduction of toxic and polluting gases in exhaust gas of engines.

Description of FIGS. 11-13

In this embodiment the engine 4 mounts the exhaust side of the engine as shown and may be in line with the radiator. The drive shaft 102 of the turbine 100 is initially driven by a belt and drive pulley 12 through a one-way or overrunning clutch 105 at the front end.

The shaft 102 is journalled in bearings 106, 107, and 108 on transverse housing walls 110, 111, and 112 located respectively at the front end, intermediate section, and rear end of a tubular housing body 114.

An air inlet 115 is provided at the leading end of the housing which communicates to a front annular chamber 116 which leads to a compression chamber 118 within which there are provided stator blades 119 on the interior of the compression chamber section 120 of the housing. Blades 119 cooperate with rotor blades 122 mounted on and constrained to rotate with shaft 102. The hot compressed air charge is discharged into the annular ignition chamber 124 at the aft end of section 120 formed by a toroidal shaped intermediate section 125 of the housing.

The chamber 124 is connected to a full injection system 126 and has a spark or glow plug 127 for igniting the charge of gasoline and air. The chamber 124 has a forward compartment 128 communicating directly with the discharge end of the compressor and has a rear portion 130 which is located at the head end of the burner section 132.

The burner or combustion section has stator blades 134 on the interior of the rear portion 135 of the housing which cooperate with rotor blades 136 mounted to an after burner tube or conduit 138 which is supported and connected by a plurality of spokes 139 to the shaft 102. Burning of the combustible mixture upon ignition in the burner chamber 137 drives the shaft 102 at a speed faster than it is driven by the pulley from the engine and exhausts into an aft chamber 142 at the rear end portion 143 of the housing, and thence through appropriate pipes 60 at the atmosphere.

It will be noted that the exhaust gasses are ported through the outlet tube 22 from the exhaust manifold 20 into an annular chamber 144 which communicates with the leading end of the after-burner tube 145. The exhaust gasses pass through the heated after-burner chamber 146, also driving the blades 148 attached to shaft 102 and tube 138, and in the intense heat conducted by the tube 138 and the spokes and blades 148, is caused to complete its combustion. The spent exhaust gasses are drawn through the discharge end 150 of the tube 138 by the negative pressure (vacuum) created in the aft chamber 142 by the high acceleration of gasses flowing from the combusion chamber 137 of the rotor. Thus, the evacuation of the exhaust gasses from the internal combustion engine 4 is enhanced and the intense heat generated in the burner section of the rotor burns all of the exhaust gasses. Any residue of the unspent exhaust gasses from the internal combustion engine will burn up in the aft chamber 142 as they are being drawn from the after-burner tube.

The tube has a close fitting sealing joint at 160 with the housing wall 161 to prevent substantial leakage of the exhaust into the mixing chamber for the combustibles in chamber 130, although some leakage may be preferred.

What is claimed is:

1. An internal combustion engine having a combustion chamber and exhaust ports in communication therewith for discharging exhaust gasses — the improvement comprising: a turbine having a housing with intercommunicating chambers including a front compression chamber, an aft burner chamber and an intermediate mixing chamber, means for compressing air in the compression chamber, means for delivering the compressed air to the mixing chamber, means for supplying a combustible gas mixture into said mixing chamber, means for igniting said combustible gas mixture in the mixing chamber, means for conducting the ignited gasses into the burner chamber, heat-transfer conduit means providing passage means for the exhaust gasses through said burner chamber isolated from the ignited gasses in the burner chamber for heating said exhaust gasses for substantial consumption of the exhaust gasses in the conduit means, and means for exhausting the spent gasses from said burner chamber and said passage means, said burner means completely enshrouding said conduit means and providing an enveloping thermal shield therefor.

2. The invention according to claim 1 and said heat transfer conduit means and said burner chamber having common exhaust passage means for mixing the exhausting gasses from said burner chamber and said conduit means for cross-igniting the same to effect substantially complete combustion thereof, and said mixing chamber being disposed in axial alignment with said compression and burner chambers and being defined at least in part by walls of said housing also defining an inlet for the exhaust gasses into said conduit means.

3. The invention according 2 and said conduit means extending within said common exhaust passage means and being rotatable therein for swirling the gasses in said common exhaust passage.

4. The invention according to claim 3 and said conduit means being rotatably supported within said turbine housing and mounted on a shaft extending through said compression chamber, and a substantially sealed rotary connection between the housing and said conduit means to prevent substantial contamination of the combustible gas mixture by the exhaust gasses being charged excessively into the burner section.

5. The invention according to claim 1 and said mixing chamber being disposed in axial alignment with said compression and burner chambers and being defined at least in part by walls of said housing also defining an inlet for the exhaust gasses into said conduit means, said housing walls and conduit means having a rotary connection therebetween and said walls of the housing forming the rear end portion of the compression chamber and the front end portion of the burner chamber for effective heat transfer therebetween.

6. The invention according to claim 1 and said conduit means having a leading end extending through said mixing chamber, and said housing having an engine exhaust gas receiving chamber portion communicating with the leading end of said conduit means, and subdividing the combustion and burner chambers and defining a portion of the mixing chamber.

7. The invention according to claim 1 and said burner chamber and conduit means being coaxially arranged, and said conduit means having an exhaust end portion extending beyond the burner chamber and said conduit means being rotatable and having means for swirling gasses within said burner chamber.

8. The invention according to claim 5 and said turbine and heat transfer conduit means having a small gas leakage from the turbine mixing chamber to the exhaust conduit means at the leading end of the burner chamber through said rotary connection.

9. The invention according to claim 8 and said conduit means having blades fixed thereto forming the rotor section of the turbine in the burner chamber.

10. The invention according to claim 1 and means for introducing at least a portion of the unspent exhaust gasses into the burner chamber.

* * * * *